US011935404B2

(12) United States Patent
Hoh et al.

(10) Patent No.: US 11,935,404 B2
(45) Date of Patent: Mar. 19, 2024

(54) INTEGRATED CONGESTED MITIGATION FOR FREEWAY NON-RECURRING QUEUE AVOIDANCE

(71) Applicants: Toyota Motor Engineering & Manufacturing North America, Inc., Plano, TX (US); McMaster University, Hamilton (CA)

(72) Inventors: Baik Hoh, Mountain View, CA (US); Hao Yang, Aliso Viejo, CA (US); Seyhan Ucar, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); MCMASTER UNIVERSITY (CA)

(*) Notice: Subject to any disclaimer, the term of this patent is extended or adjusted under 35 U.S.C. 154(b) by 241 days.

(21) Appl. No.: 17/211,390

(22) Filed: Mar. 24, 2021

(65) Prior Publication Data

US 2022/0309919 A1 Sep. 29, 2022

(51) Int. Cl.
*G08G 1/0967* (2006.01)
*G08G 1/01* (2006.01)

(52) U.S. Cl.
CPC ..... *G08G 1/096725* (2013.01); *G08G 1/0133* (2013.01)

(58) Field of Classification Search
CPC ........................ G08G 1/0133; G08G 1/096725
See application file for complete search history.

(56) References Cited

U.S. PATENT DOCUMENTS

| | | | | |
|---|---|---|---|---|
| 9,361,801 | B2 * | 6/2016 | Ochi | G01S 13/345 |
| 9,718,473 | B2 | 8/2017 | Suzuki | |
| 10,163,353 | B2 | 12/2018 | Glander | |
| 10,203,699 | B1 * | 2/2019 | Kim | H04L 67/12 |
| 10,754,029 | B2 | 8/2020 | Talamonti et al. | |
| 10,891,854 | B2 * | 1/2021 | Oyama | G08G 1/096822 |
| 11,468,769 | B2 * | 10/2022 | Huang | G08G 1/08 |
| 2002/0082767 | A1 * | 6/2002 | Mintz | G08G 1/0133 340/934 |
| 2013/0013178 | A1 * | 1/2013 | Brant | G08G 1/0145 701/117 |
| 2013/0041573 | A1 * | 2/2013 | Ochi | G08G 1/08 701/117 |

(Continued)

FOREIGN PATENT DOCUMENTS

| | | | | |
|---|---|---|---|---|
| CN | 109795487 A * | 5/2019 | | B60Q 1/34 |
| DE | 102004039741 A1 | 2/2006 | | |

(Continued)

*Primary Examiner* — Luis A Martinez Borrero
(74) *Attorney, Agent, or Firm* — DINSMORE & SHOHL LLP

(57) ABSTRACT

A method of operating a traffic management system may comprise identifying a vehicle queue in a first lane of a road based on sensor data from one or more connected vehicles traveling along the road, determining driving instructions for a connected vehicle within a queue management region in a second lane, adjacent to the first lane, to create a gap in front of the connected vehicle for a vehicle in the vehicle queue to change lanes into the gap, and transmitting the driving instructions to the connected vehicle.

7 Claims, 8 Drawing Sheets

(56) References Cited

U.S. PATENT DOCUMENTS

| | | | | |
|---|---|---|---|---|
| 2015/0032289 | A1* | 1/2015 | Lotz | H04L 67/12 701/1 |
| 2017/0206783 | A1* | 7/2017 | Miller | G08G 1/0116 |
| 2017/0270785 | A1* | 9/2017 | Umehara | G08G 1/08 |
| 2018/0096597 | A1* | 4/2018 | Mortazavi | H04W 4/027 |
| 2018/0178802 | A1 | 6/2018 | Miyata | |
| 2019/0278285 | A1 | 9/2019 | Umeda et al. | |
| 2019/0318620 | A1* | 10/2019 | Yang | G08G 1/0133 |
| 2020/0070834 | A1 | 3/2020 | Mizoguchi | |
| 2020/0286370 | A1* | 9/2020 | Wickramarathne | G08G 1/0112 |
| 2020/0312129 | A1* | 10/2020 | Oyama | G08G 1/096725 |
| 2020/0398840 | A1 | 12/2020 | Kurihara | |
| 2021/0142659 | A1* | 5/2021 | Chen | G08G 1/0141 |
| 2021/0142660 | A1* | 5/2021 | Huang | G08G 1/0145 |
| 2022/0084405 | A1* | 3/2022 | Zhang | G08G 1/096775 |
| 2022/0097711 | A1* | 3/2022 | Liu | G08G 1/096741 |
| 2022/0114885 | A1* | 4/2022 | Ran | B60W 40/04 |
| 2022/0198920 | A1* | 6/2022 | Shivarkar | G08G 1/0141 |
| 2022/0219731 | A1* | 7/2022 | Ran | G06V 20/597 |
| 2022/0270476 | A1* | 8/2022 | Ran | G08G 1/0129 |

FOREIGN PATENT DOCUMENTS

| | | | | |
|---|---|---|---|---|
| DE | 102019108080 | A1 * | 10/2019 | G05D 1/0022 |
| WO | WO-2020249122 | A1 * | 12/2020 | B60W 30/18163 |

* cited by examiner

| TRAVEL TIME DELAY | BASE | QM ONLY | | QM + LCA | |
|---|---|---|---|---|---|
| | | DELAY | SAVING | DELAY | SAVING |
| ALL VEHICLES | 68.86 | 50.11 | 27.2% | 16.95 | 75.4% |
| NON-CV | 70.58 | 47.14 | 33.2% | 17.28 | 75.5% |
| CV | 58.76 | 44.88 | 4.9% | 9.19 | 84.4% |

FIG. 7

INTEGRATED CONGESTED MITIGATION FOR FREEWAY NON-RECURRING QUEUE AVOIDANCE

TECHNICAL FIELD

The present specification relates to a traffic management system and more particularly to integrated congestion mitigation for freeway non-recurring queue avoidance.

BACKGROUND

Non-recurring traffic congestion accounts for up to 50% of city traffic congestion. Non-recurring traffic congestion may be caused by traffic accidents, vehicle breakdown, distracted drivers, icy roads, and other factors. Recurring traffic congestion, on the other hand, is typically caused by excessive traffic that may occur at a similar time every day (e.g., rush hour). Drivers may get used to recurring traffic congestion and may adapt their driving behavior accordingly, over time to increase traffic flow. However, because non-recurring traffic congestion is irregular, drivers may not be prepared to make lane changes at the appropriate times to avoid increasing traffic congestion. As such, this may cause vehicle queues to form in certain lanes.

When a vehicle queue forms in one lane of a multi-lane road, overall traffic flow may be increased if some of the vehicles in the lane with the vehicle queue change lanes to an adjacent lane that does not have a vehicle queue. However, if traffic in the adjacent lane is moving significantly faster than traffic in the lane with the vehicle queue, it may be difficult for vehicles in the lane with the vehicle queue to change lanes. While it may benefit the overall traffic flow if one or more vehicles in the adjacent lane slow down to allow for vehicles to change lanes from the lane with the vehicle queue, it may not benefit any one vehicle in the adjacent lane to do so. And it may be challenging for drivers to adjust their driving behavior to improve overall traffic flow since an individual driver may not be aware of the overall traffic situation and is unable to act collectively with other vehicles.

However, connected vehicles allow for communication between multiple vehicles on a road. As such, a plurality of connected vehicles may each gather and share sensor data, which may collectively allow for an assessment of the overall traffic flow. In addition, connected vehicles can coordinate their driving behavior to benefit traffic flow overall and reduce congestion and vehicle queues. Thus, there is a need for integrated congestion mitigation for freeway non-recurring queue avoidance.

SUMMARY

In an embodiment, a method of operating a traffic management system may include identifying a vehicle queue in a first lane of a road based on sensor data from one or more connected vehicles traveling along the road, determining driving instructions for a connected vehicle within a queue management control region in a second lane, adjacent to the first lane, to create a gap in front of the connected vehicle for a vehicle in the vehicle queue to change lanes into the gap, and transmitting the driving instructions to the connected vehicle.

In another embodiment, a server may include a controller configured to identify a vehicle queue in a first lane of a road based on sensor data from one or more connected vehicles traveling along the road, determine driving instructions for a connected vehicle in a queue management control region within a second lane, adjacent to the first lane, to create a gap in front of the connected vehicle for a vehicle in the vehicle queue to change lanes into the gap, and transmit the driving instructions to the connected vehicle.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 7 illustrates additional simulation results of traffic levels when using the traffic management server of FIGS. 1 and 3, according to one or more embodiments shown and described herein.

DETAILED DESCRIPTION

Figure 1:
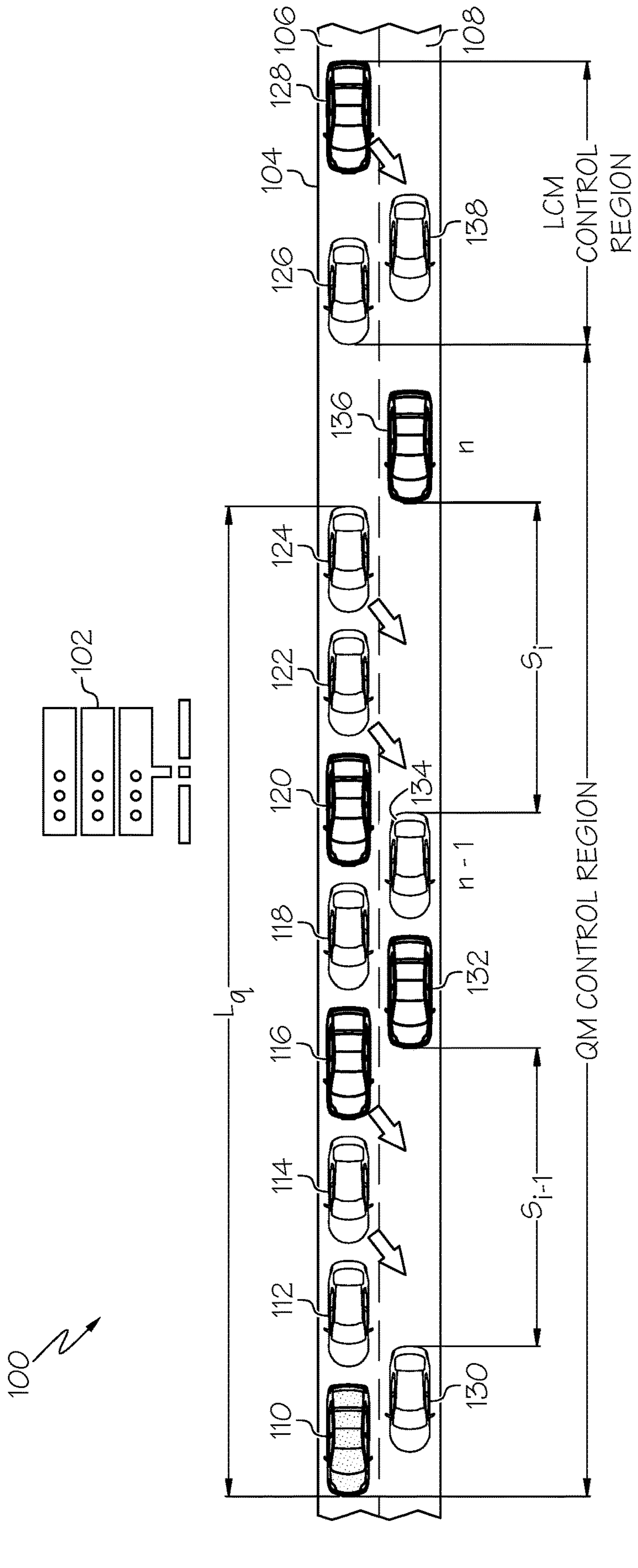
FIG. 1 schematically depicts a system comprising a traffic management server, according to one or more embodiments shown and described herein.

The embodiments disclosed herein include a traffic management system for integrated congestion mitigation for freeway non-recurring queue avoidance. It is expected that the number of connected vehicles on the road (both human driven and autonomous) will increase around the world in the next several decades. A connected vehicle is able to communicate remotely with systems outside of the vehicle (e.g., a traffic management system or other vehicles). In particular, a connected vehicle may communicate with a traffic management system.

A connected vehicle may collect a variety of data from sensors and other on-board equipment. This data may include information about the state of the vehicle (e.g., speed, trajectory, and the like). The connected vehicle may also collect data external to the vehicle. For example, vehicle sensors may determine positions, speeds, and trajectories of other vehicles on the road. Vehicle sensors may also collect data about weather, road conditions, or other factors.

Autonomous vehicles may use data collected by vehicle sensors to perform autonomous driving. However, connected vehicles (either autonomous or human-driven) may also transmit collected data to a traffic management system. A traffic management system may receive data from a plurality of connected vehicles. Thus, the traffic management system may determine an overall traffic state on a particular road or within a particular geographic area based on data received from multiple connected vehicles.

Because the traffic management system may receive data from multiple connected vehicles, the traffic management system may determine a more accurate picture of an overall traffic environment than any individual connected vehicle. Furthermore, the traffic management system may determine driving instructions that may be performed by one or more of the connected vehicles to improve overall traffic flow or satisfy other goals or constraints. For example, the traffic management system may determine that traffic flow would be improved if certain vehicles would perform a lane change, adjust their speed, or perform other driving actions.

Accordingly, the traffic management system may determine driving instructions for one or more connected vehicles and may transmit the determined driving instructions to each of the appropriate vehicles. Each connected vehicle that receives driving instructions from the traffic management system may then implement the received driving instructions (either autonomously or by presenting the driving instructions to a human driver). Thus, the overall traffic flow may be improved.

In embodiments disclosed herein, connected vehicles may collect sensor data to detect vehicles in different lanes of a multi-lane road (e.g., a freeway or expressway). The connected vehicles may transmit the collected sensor data to a traffic management system (e.g., a server). After receiving sensor data from one or more connected vehicles, the traffic management system may identify a vehicle queue in one or more lanes of the multi-lane road, based on the sensor data. The traffic management system may then identify one or more connected vehicles in a lane adjacent to a lane having a vehicle queue and may transmit instructions to the identified connected vehicles to cause those vehicles to adjust their driving behavior (e.g., slowing down) such that vehicles in the lane with the vehicle queue may more easily change lanes into the adjacent lane. This may reduce the number of vehicles in the queue and increase overall traffic flow.

The traffic management system may further identify one or more connected vehicles traveling in the same lane as the vehicle queue but behind the vehicle queue. The traffic management system may transmit instructions to these vehicles to cause the vehicles to change lanes before they reach the vehicle queue. As such, this may prevent the identified vehicles from adding to the vehicle queue as they approach the location of the vehicle queue, thereby increasing traffic flow.

Turning now to the figures, FIG. 1 schematically depicts a system for integrated congestion mitigation for freeway non-recurring queue avoidance. A system 100 includes a traffic management system 102. The traffic management system 102 may receive data from one or more connected vehicles, as disclosed herein. In the example of FIG. 1, a plurality of vehicles drive along a road 104. In the example of FIG. 1, the road 104 has two lanes 106 and 108. However, it should be understood that in other examples, the system 100 may be used with roads having any number of lanes.

In the example of FIG. 1, vehicles 110, 112, 114, 118, 122, 124, 126, 130, 134, and 138 traveling along the road 104 are non-connected vehicles, and vehicles 116, 120, 128, 132, and 136 traveling along the road 104 are connected vehicles. However, it should be understood that in other examples, the system 100 may be used with any number of connected vehicles and any number of non-connected vehicles. Each of the connected vehicles 116, 120, 128, 132, and 136 may be a human-driven connected vehicle or an autonomous connected vehicle. Each of the vehicles 110-138 may be an automobile or any other passenger or non-passenger vehicle such as, for example, a terrestrial, aquatic, and/or airborne vehicle including, but not limited to, a bus, a scooter, a drone, or a bicycle.

The traffic management system 102 may be communicatively coupled to one or more of the connected vehicles 116, 120, 128, 132, 136. In some examples, the traffic management system 102 may be a road-side unit (RSU) positioned near the road 104. In these examples, the system 100 may include any number of RSUs spaced along the road 104 such that each RSU covers a different service area. That is, as vehicles drive along the road 104, the vehicles may be in range of different RSUs at different times such that different RSUs provide coverage at different locations. Thus, as vehicles drive along the road 104, the vehicles may move between coverage areas of different RSUs.

In other examples, the traffic management system 102 may be another type of server or computing device and may be positioned remotely from the road 104. In some examples, the traffic management system 102 may be an edge server. In some examples, the traffic management system 102 may be a moving edge server, such as another vehicle. In some examples, the traffic management system 102 may be a cloud-based server.

As connected vehicles drive along the road 104, the connected vehicles may gather sensor data and may transmit the sensor data to the traffic management system 102. In some examples, the traffic management system 102 may also receive sensor data from other traffic infrastructure (e.g., traffic cameras). The sensor data received by the traffic management system 102 may comprise information about the vehicles on the road 104 (e.g., speeds and positions of vehicles along the road 104).

After receiving sensor data or other data, the traffic management system 102 may determine driving instructions to be performed by one or more connected vehicles using the techniques described herein. In particular, the traffic management system 102 may determine driving instructions to be performed by one or more connected vehicles in order to avoid or mitigate vehicle queues, as disclosed in further detail below. After determining the driving instructions for one or more connected vehicles, the traffic management system 102 may transmit the determined driving instructions to the one or more connected vehicles. After receiving driving instructions, the connected vehicles may perform the driving maneuvers specified by the driving instructions.

In the example of FIG. 1, the vehicle 110 is driving slower than the other vehicles or stopped on the road 104. This may be due to mechanical problems, an inattentive driver, or any number of other factors. Because of the driving behavior of the vehicle 110, a vehicle queue has formed behind the vehicle 110 in lane 106 including the vehicles 112, 114, 116, 118, 120, 122, and 124. Each of the vehicles in the queue is forced to drive slower than desired, thereby reducing the flow of traffic along the road 104. In addition, the vehicles 126 and 128 are approaching the vehicle queue. If the vehicles 126 and 128 do not change lanes before reaching the vehicle queue, they may get stuck in the vehicle queue, thereby increasing its length and further reducing traffic flow.

The vehicles 130, 132, 134, 136, and 138 in lane 108 are not forced to slow down because of the vehicle 110. Accordingly, these vehicles are able to drive at a higher speed than the vehicles in the lane 106. Accordingly, traffic flow may be increased if some of the vehicles in the lane 106 are able to move into the lane 108. This may be facilitated by the traffic management system 102, as disclosed herein.

In the example of FIG. 1, the lane 106 may be a lane dedicated to autonomous vehicles while the lane 108 may be a lane open to all vehicles. In this example, the vehicle 110 may experience an equipment malfunction, which may cause the vehicle queue to form, thereby causing traffic congestion. Accordingly, the techniques disclosed herein may be used to alleviate the traffic congestion caused by the malfunction of the vehicle 110. However, in other examples, the lane 106 needs not be dedicated to autonomous vehicles or to any particular type of vehicle.

Figure 2:
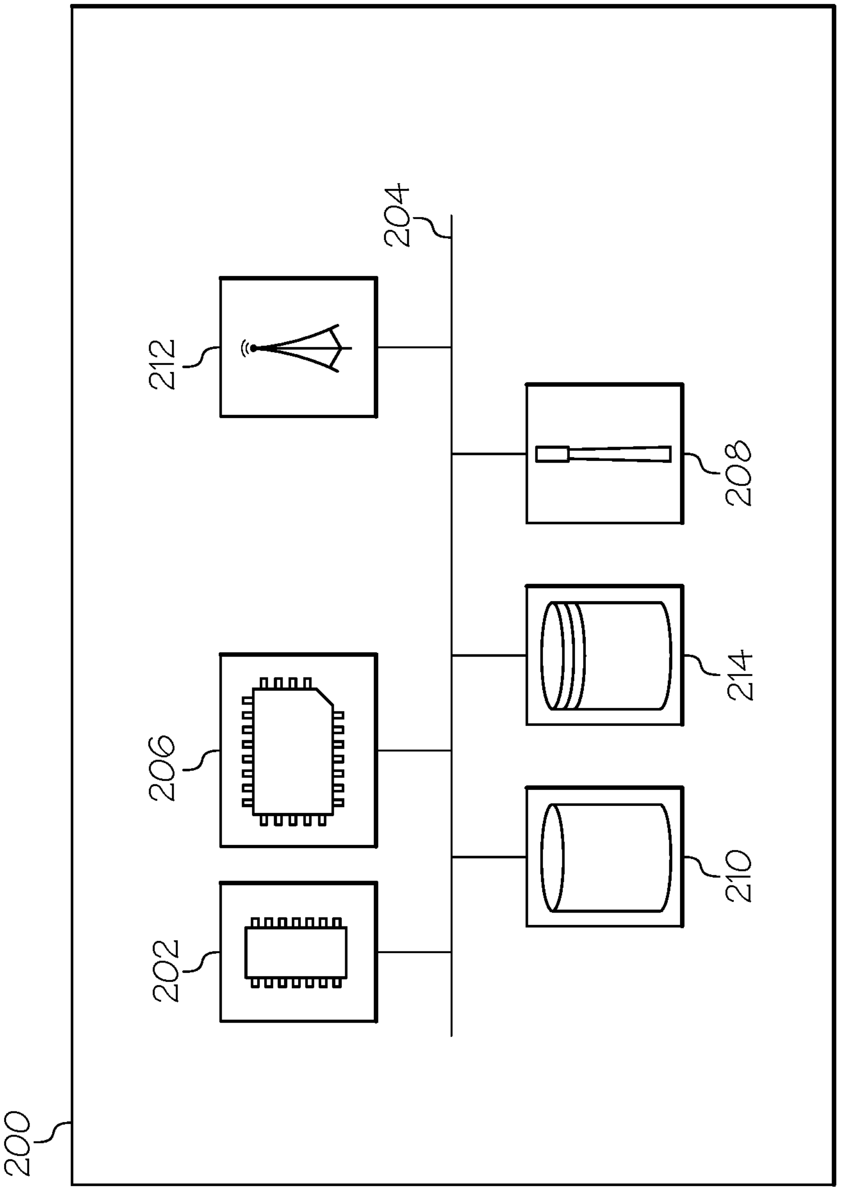
FIG. 2 depicts a schematic diagram of a vehicle system, according to one or more embodiments shown and described herein.

FIG. 2 depicts a vehicle system 200 that may be included in the connected vehicles 116, 120, 128, 132, and 136 of FIG. 1. The vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs. The vehicle system 200 may be included in a human driven connected vehicle and in an autonomous connected vehicle.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more sensors 210 may include, but are not limited to, LiDAR sensors, RADAR sensors, optical sensors (e.g., cameras, laser sensors, proximity sensors, location sensors (e.g., GPS modules)), and the like. In embodiments, the sensors 210 may monitor the surroundings of the vehicle and may detect other vehicles on the road. In particular, the sensors 210 may determine locations and/or speeds of other vehicles (which may be connected vehicles and/or non-connected vehicles).

For autonomous vehicles, the vehicle system 200 may include an autonomous driving module and the data gathered by the sensors 210 may be used by the autonomous driving module to autonomously navigate the vehicle.

Still referring to FIG. 2, the vehicle system 200 comprises network interface hardware 212 for communicatively coupling the vehicle system 200 to the traffic management system 102 and/or another vehicle system via vehicle-to-everything (V2X) communication or vehicle-to-vehicle (V2V) communication. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit sensor data gathered by the sensors 210 to the traffic management system 102.

Still referring to FIG. 2, the vehicle system 200 comprises a data storage component 214. The data storage component 214 may store data used by various components of the vehicle system 200. In addition, the data storage component 214 may store data gathered by the sensors 210.

The vehicle system 200 may also include an interface. The interface may allow for data to be presented to a human driver and for data or other information to be input by the driver. For example, the interface may include a screen to display information to a driver, speakers to present audio information to the driver, and a touch screen that may be used by the driver to input information. In other examples, the vehicle system 200 may include other types of interfaces.

In some embodiments, the vehicle system 200 may be communicatively coupled to the traffic management system 102 by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
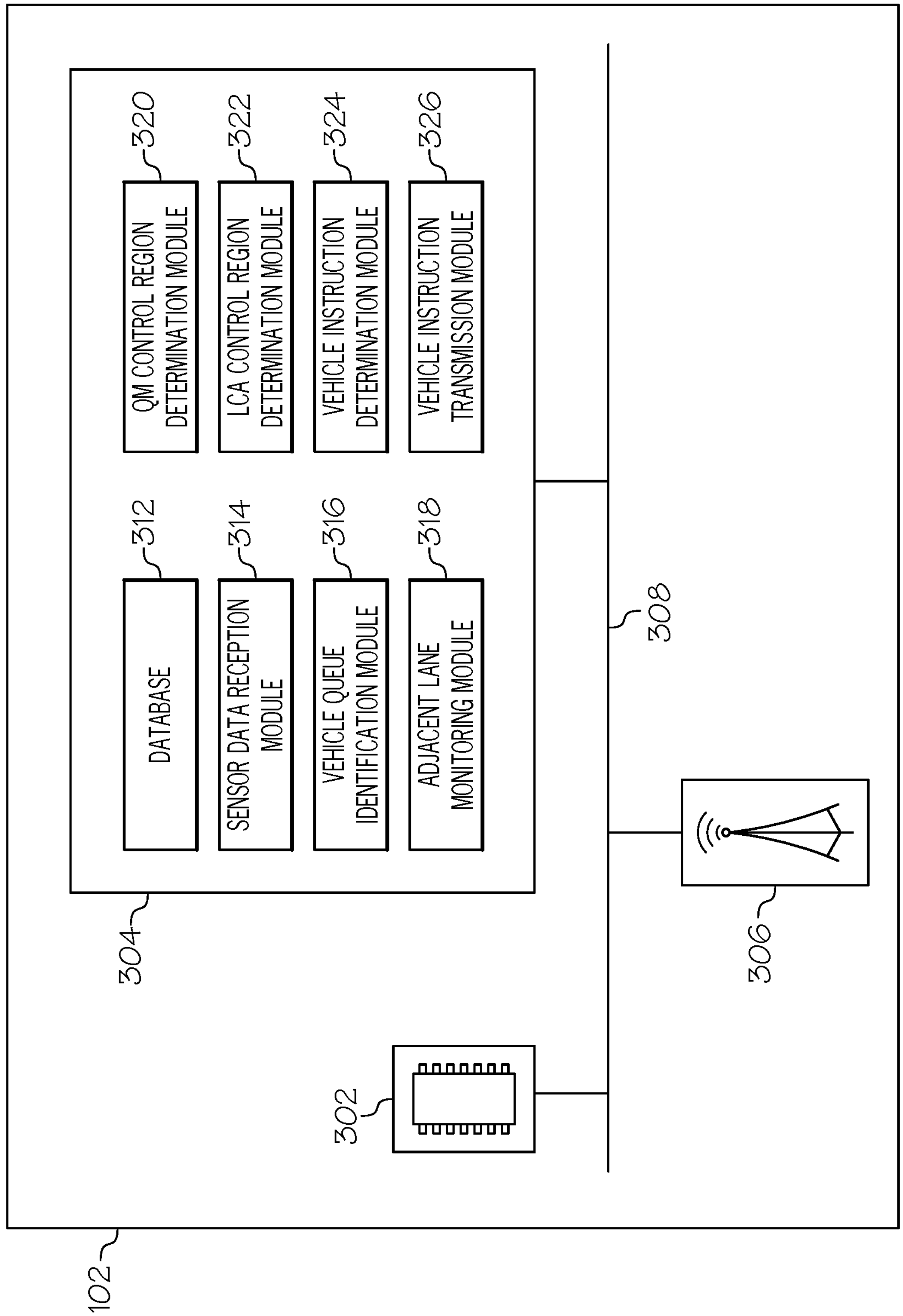
FIG. 3 depicts a schematic diagram of the traffic management server of FIG. 1, according to one or more embodiments shown and described herein.

Now referring to FIG. 3, the traffic management system 102 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the traffic management system 102 may transmit and receive data to and from connected vehicles.

The one or more memory modules 304 include a database 312, a sensor data reception module 314, a vehicle queue identification module 316, an adjacent lane monitoring module 318, a QM control region determination module 320, an LCA control region determination module 322, a vehicle instruction determination module 324, and a vehicle instruction transmission module 326. Each of the database 312, the sensor data reception module 314, the vehicle queue identification module 316, the adjacent lane monitoring module 318, the QM control region determination module 320, the LCA control region determination module 322, the vehicle instruction determination module 324, and the vehicle instruction transmission module 326 may be a program module in the form of operating systems, application program modules, and other program modules stored in one or more memory modules 304. In some embodiments, the program module may be stored in a remote storage device that may communicate with the traffic management system 102. In some embodiments, one or more of the database 312, the sensor data reception module 314, the vehicle queue identification module 316, the adjacent lane monitoring module 318, the QM control region determination module 320, the LCA control region determination module 322, the vehicle instruction determination module 324, and the vehicle instruction transmission module 326 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 312 may store sensor data received from connected vehicles. The database 312 may also store other data that may be used by the memory modules 304 and/or other components of the traffic management system 102.

The sensor data reception module 314 may receive data captured by sensors of connected vehicles. The sensor data received by the sensor data reception module 314 may include positions, speeds, and other information about vehicles detected by one or more connected vehicles. In some examples, the sensor data reception module 314 may also receive data captured by traffic infrastructure (e.g., traffic cameras) or other entities. The sensor data received by the sensor data reception module 314 may be used by the traffic management system 102 as disclosed herein.

The vehicle queue identification module 316 may identify a vehicle queue in a lane of traffic. For example, the vehicle queue identification module 316 may identify the vehicle queue comprising of vehicles 110, 112, 114, 116, 118, 120, 122, and 124 in the example of FIG. 1. A vehicle queue may comprise a plurality of vehicles driving together in one lane with an average speed that is less than the average speed of vehicles in an adjacent lane by more than a predetermined threshold amount. In the example of FIG. 1, vehicle 110 is driving in lane 106 at a slower speed than the vehicles in lane 108. This causes vehicles 112, 114, 116, 118, 120, 122, and 124 to drive at the same speed or slower than vehicle 110. Thus, the average speed of these vehicles is less than the average speed of the vehicles in lane 108. As such, vehicles 110, 112, 114, 116, 118, 120, 122, and 124 in the example of FIG. 1 form a vehicle queue in lane 106.

The vehicle queue identification module 316 may identify a vehicle queue based on the data received by the sensor data reception module 314. In particular, the sensor data reception module 314 may receive sensor data indicating positions and speeds of vehicles driving along a road. As such, the vehicle queue identification module 316 may identify a vehicle queue and may determine certain parameters associated with the vehicle queue. In particular, the vehicle queue identification module 316 may determine a length of a vehicle queue, the front and tail locations of the vehicle queue, and the moving speed of the vehicle queue.

In the example of FIG. 1, the length of the vehicle queue in lane 106 is indicated as Lq, the front location of the vehicle queue is the front of vehicle 110 and the tail location of the vehicle queue is the tail of vehicle 124. The speed of the vehicle queue may be the average speed of the vehicles in the queue. When vehicles are in a queue, the speed of each vehicle in the queue is likely to be about the same as the other vehicles in the queue. As an identified vehicle queue changes over time (e.g., as vehicles enter or leave the queue or the speed of the queue changes), the vehicle queue identification module 316 may dynamically update the parameters of the vehicle queue.

Referring back to FIG. 3, the adjacent lane monitoring module 318 may monitor vehicles in a lane adjacent to a lane in which a vehicle queue has been identified by the vehicle queue identification module 316 (referred to herein as an adjacent lane). The adjacent lane monitoring module 318 may monitor vehicles based on the data received by the sensor data reception module 314. In particular, the adjacent lane monitoring module 318 may monitor speeds and positions of vehicles in an adjacent lane. The adjacent lane monitoring module 318 may also identify connected and non-connected vehicles in the adjacent lane.

For each connected vehicle identified in the adjacent lane, the adjacent lane monitoring module 318 may determine the location of the vehicle, the speed of the vehicle, and the spacing between the vehicle and the closest vehicle in front of it (a leading vehicle). For example, as shown in FIG. 1, the spacing between the connected vehicle 136 and the non-connected leading vehicle 134 is illustrated as Si. In addition, the spacing between the connected vehicle 132 and the non-connected vehicle 130 in front of the vehicle 132 is illustrated as Si-1. The adjacent lane monitoring module 318 may determine this information for each connected vehicle identified in the adjacent lane based on the data received by the sensor data reception module 314.

Referring back to FIG. 3, the QM control region determination module 320 may determine a queue management ("QM") control region as disclosed herein. The QM control region determination module 320 may determine a QM control region based on the determinations made by the vehicle queue identification module 316 and the adjacent lane monitoring module 318.

A QM control region may comprise a region in which the traffic management system 102 performs queue management utilizing the techniques disclosed herein. In particular, connected vehicles within a QM control region in a lane adjacent to a lane with a vehicle queue may adjust their speeds to allow vehicles in the lane with the vehicle queue to perform a lane change. A QM control region may be defined with respect to vehicles on the road rather than with respect to the road itself. That is, as vehicles travel along a road, the QM control region moves along with the vehicles.

In some examples, the QM control region determination module 320 may determine a QM control region spanning from the front location of an identified vehicle queue to a predetermined fixed distance (e.g., 100 m) behind the tail location of the vehicle queue. By including a distance behind the tail location of the vehicle queue as part of the QM control region, vehicles in an adjacent lane that are positioned behind the vehicle queue may be part of the QM control region. This may allow for better queue management performance.

In some examples, the QM control region may extend behind the tail location of the vehicle queue by a dynamic amount rather than a fixed distance (e.g., 10% of the length of the vehicle queue). In some examples, the size of the QM control region may depend on the speed of the identified vehicle or the speed of vehicles in an adjacent lane.

In some examples, the length of the QM control region may depend on the position of vehicles in an adjacent lane. For example, if a connected vehicle in an adjacent lane is within a predetermined threshold distance behind a vehicle queue, the QM control region may extend to the location of the connected vehicle so that the connected vehicle can be part of the vehicle queue. In the example of FIG. 1, a QM control region extends from the front location of vehicle 110 in lane 106 to behind the location of connected vehicle 136 in lane 108. The QM control region determination module 320 may dynamically modify the size of a QM control region as driving conditions change (e.g., as the length and/or speed of the identified vehicle queue changes or as the number and/or speed of vehicles in an adjacent lane changes).

Referring back to FIG. 3, the LCA control region determination module 322 may determine a lane change assistance ("LCA") control region as disclosed herein. The LCA control region determination module 322 may determine an LCA control region based on the determinations made by the vehicle queue identification module 316 and the adjacent lane monitoring module 318 and based on a QM control region determined by the QM control region determination module 320.

An LCA control region may comprise a region in which the traffic management system 102 performs lane change assistance utilizing the techniques disclosed herein. In particular, connected vehicles within an LCA control region may change lanes from a lane in which a vehicle queue is located ahead to an adjacent lane that does not contain a vehicle queue. As discussed above with respect to a QM control region, an LCA control region may be defined with respect to vehicles on a road and an LCA control region may move as vehicles travel along a road.

An LCA control region may comprise a region behind a QM control region. In some examples, the LCA control region determination module 322 may determine an LCA control region spanning from the tail end of a QM control region to a fixed distance behind the tail end of the QM control region (e.g., 1 km). In some examples, the LCA control region determination module 322 may determine an LCA control region spanning behind the tail end of a QM control region by a percentage of the length of the QM control region (e.g., twice as long as the QM control region). In some examples, an LCA control region may depend on a speed of a vehicle queue and/or speeds of vehicles in an adjacent lane.

An LCA control region may comprise a region behind a QM control region (and consequently behind a vehicle queue) in which vehicles are approaching but have not yet reached an identified vehicle queue. If vehicles in the LCA control region continue to drive in the same lane, they will likely reach the vehicle queue and be stuck at the end of the vehicle queue, thereby increasing the length of the queue and increasing traffic congestion. However, if vehicles in the LCA control region change lanes before reaching the vehicle queue, when it is likely easier to change lanes, then these vehicles can avoid the vehicle queue completely, thereby increasing traffic flow. In the example of FIG. 1, an illustrated LCA control region extends behind the illustrated QM control region and contains the connected vehicle 128 and the non-connected vehicles 126 and 138. The tail end of the LCA control region may extend back a distance as discussed above.

As traffic conditions change over time (e.g., as vehicles enter or leave a vehicle queue), the LCA control region determination module 322 may dynamically adjust the length of the LCA control region accordingly. In some examples, the traffic management system 102 may observe the overall performance of the system (e.g., the improvement to traffic flow) and the LCA control region determination module 322 may adjust the length of the LCA control region to improve performance.

Referring back to FIG. 3, the vehicle instruction determination module 324 may determine instructions for connected vehicles using the techniques disclosed herein. The vehicle instruction determination module 324 may determine two types of vehicle instructions; a first type of vehicle instructions for connected vehicles within a QM control region and a second type of vehicle instructions for connected vehicles within an LCA control region.

For vehicles within a QM control region, the goal of the traffic management system 102 is to improve overall traffic flow by allowing vehicles in a vehicle queue to change lanes and get out of the vehicle queue. As discussed above, the speed of a vehicle queue is generally much lower than the speed of vehicles in an adjacent lane. As such, it may be difficult for vehicles in the vehicle queue to easily change lanes. Because of this, vehicles may remain in a vehicle queue longer than desired, thereby reducing traffic flow. However, if vehicles in a vehicle queue are able to easily change lanes, they may do so more readily. This may reduce the number of vehicles in a queue and the amount of time that vehicles spend in a queue, thereby increasing traffic flow.

In order to allow for vehicles in a queue to more easily change lanes, gaps may be created between vehicles in the adjacent lane. Thus, vehicles in the queue may be encouraged change lanes into the gaps created. For example, as shown in FIG. 1, the vehicle 114 or 116 may change lanes in between the vehicles 130 and 132 and the vehicle 122 or 124 may change lanes in between vehicles 134 and 136.

In order to create gaps in a lane adjacent to a vehicle queue, the vehicle instruction determination module 324 may determine appropriate vehicle instructions for connected vehicles in the adjacent lane. In embodiments, the vehicle instruction determination module 324 may determine vehicle instructions for a connected vehicle in the adjacent lane to adjust its speed to create a gap for a vehicle in the vehicle queue to change lanes into.

As discussed above, the adjacent lane monitoring module 318 may determine speeds of connected vehicles in the adjacent lane and a distance between each connected vehicle and a leading vehicle in front of the connected vehicle. In some examples, for each connected vehicle in the adjacent lane that is within the QM control region, the vehicle instruction determination module 324 may determine whether the distance between the connected vehicle and the leading vehicle in front of the connected vehicle is greater than a threshold distance. This threshold distance may be determined such that a vehicle in the vehicle queue can easily change lanes in between the connected vehicle and the leading vehicle. In some examples, the threshold distance may be a fixed amount (e.g., 30 feet). In other examples, the threshold distance may depend on the speed of the vehicle queue and/or the speed of the connected vehicle and the leading vehicle in the adjacent lane. This may account for the fact that it may be more difficult to change lanes at higher speeds.

In some examples, if the distance between a connected vehicle in the adjacent lane in the QM control region and a leading vehicle in front of the connected vehicle is less than a threshold distance, the vehicle instruction determination module 324 may determine vehicle instructions for the connected vehicle to cause the connected vehicle to slow down so as to increase the distance to the leading vehicle until the distance to the leading vehicle is greater than the threshold distance.

In some examples, the vehicle instruction determination module 324 may use a game theoretic framework to determine instructions for connected vehicles. For example, a simplified system may consider a stuck vehicle in a vehicle queue in a first lane, which may be a connected vehicle or a non-connected vehicle, and a connected vehicle in an adjacent lane to the vehicle queue. The connected vehicle in the adjacent lane can either yield to allow the stuck vehicle to change lanes into the adjacent lane in front of the connected vehicle or block the stuck vehicle from changing lanes into the adjacent lane. Furthermore, the stuck vehicle can either change lanes into the adjacent lane, wait for the connected vehicle to pass, or overtake the connected vehicle.

As such, a game theory matrix may be created comprising the two possible decisions for the connected vehicle and the three possible decisions for the stuck vehicle, thereby yielding six possible outcomes or combinations of the decisions of the two vehicles. Each possible outcome may have a payoff value for the connected vehicle and the stuck vehicle based on the speeds of the vehicle and other road conditions. The preferred outcome to increase overall traffic flow is for the connected vehicle to yield and the stuck vehicle to change lanes. Therefore, the vehicle instruction determination module 324 may determine vehicle instructions for the connected vehicle (e.g., determine a speed that the connected vehicle should travel) such that the payoff value for both the connected vehicle and the stuck vehicle is maximized for this desired outcome.

Referring back to FIG. 3, the vehicle instruction determination module 324 can also determine driving instructions for connected vehicles in an LCA control region in a lane that has a vehicle queue. When a vehicle is in an LCA control region, the vehicle is approaching but has not yet reached an identified vehicle queue. Accordingly, for vehicles in the LCA control region, the goal of the traffic management system 102 is for vehicles in the LCA control region to change lanes into an adjacent lane before reaching the vehicle queue. While the traffic management system 102 may be unable to affect non-connected vehicles in the LCA control region, the vehicle instruction determination module 324 may determine driving instructions for connected vehicles in the LCA control region.

In some examples, the vehicle instruction determination module 324 may identify connected vehicles in the LCA control region and may determine driving instructions to cause a connected vehicle in the LCA control region to change lanes into an adjacent lane. In some examples, the vehicle instruction determination module 324 may determine such lane change instructions as soon as a connected vehicle enters the LCA control region. In other examples, the vehicle instruction determination module 324 may determine lane change instructions when a connected vehicle is within a threshold distance from the tail end of a vehicle queue (e.g., within 500 feet). In other examples, the vehicle instruction determination module 324 may determine lane change instructions when a connected vehicle is within a threshold distance of a vehicle queue, in which the threshold distance may change based on the speed of the connected vehicle. This may account for the fact that the connected vehicle approaches the vehicle queue at a faster rate at higher vehicle speeds.

By instructing connected vehicles in the LCA control region to change lanes before they reach an identified vehicle queue, the connected vehicles may avoid joining the vehicle queue and increasing traffic congestion. This may increase overall traffic flow. In the example of FIG. 1, the vehicle 128 may change lanes from the lane 106 to the lane 108 before reaching the vehicle queue in the lane 106.

Referring still to FIG. 3, the vehicle instruction transmission module 326 may transmit driving instructions determined by the vehicle instruction determination module 324 to connected vehicles. That is, for each connected vehicle for which the vehicle instruction determination module 324 determines driving instructions, the vehicle instruction transmission module 326 may transmit the determined driving instructions to that vehicle. Accordingly, connected vehicles in the QM control region or the LCA control region may receive the appropriate driving instructions determined by the traffic management system 102 to improve traffic flow.

After a connected vehicle receives driving instructions from the vehicle instruction transmission module 326, the connected vehicle may implement the received driving instructions. For autonomous connected vehicles, the driving instructions may be implemented autonomously. For human-driven connected vehicles, the driving instructions may be displayed or otherwise presented to the human driver such that the human driver may follow the driving instructions.

Figure 4:
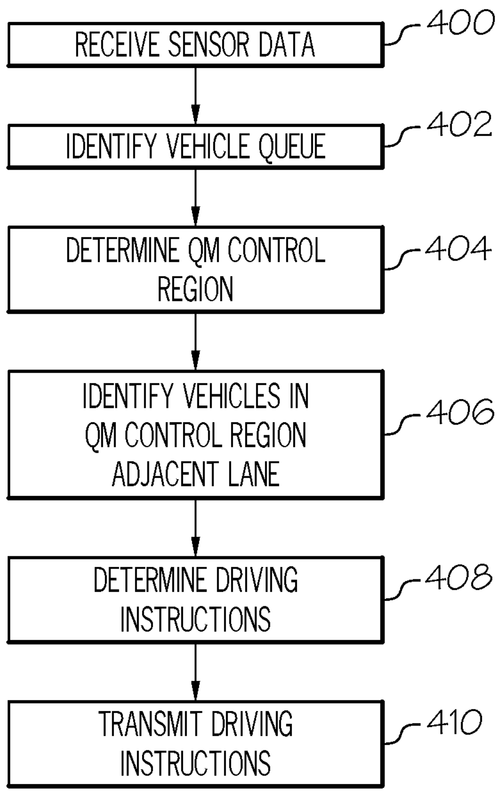
FIG. 4 depicts an example method of operating the traffic management system of FIGS. 1 and 3 to perform queue management, according to one or more embodiments shown and described herein.

FIG. 4 depicts a flowchart for operating the traffic management system 102 to perform queue management. At step 400, the sensor data reception module 314 receives sensor data from one or more connected vehicles. The received sensor data may indicate positions, speeds, and other information about connected and non-connected vehicles traveling along a road.

At step 402, the vehicle queue identification module 316 identifies a vehicle queue in a lane of traffic based on the data received by the sensor data reception module 314. In particular, the vehicle queue identification module 316 may determine a length of a vehicle queue, the front and tail locations of the vehicle queue, and the moving speed of the vehicle queue.

At step 404, the QM control region determination module 320 determines a QM control region based on data associated with the vehicle queue identified by the vehicle queue identification module 316. In some examples, the QM control region determination module 320 may determine a QM control region spanning from the front location of the vehicle queue to a predetermined fixed distance behind the tail location of the vehicle queue. In other examples, the QM control region determination module 320 may determine the QM control region in any other manner.

At step 406, the adjacent lane monitoring module 318 identifies vehicles in the QM control region in a lane adjacent to the lane contain the vehicle queue. In particular, the adjacent lane monitoring module 318 may determine speeds and positions of connected and non-connected vehicles the QM control region in the adjacent lane. Additionally, for each connected vehicle identified in the QM control region in the adjacent lane, the adjacent lane monitoring module 318 may determine a spacing between the connected vehicle and the closest vehicle in front of the connected vehicle.

At step 408, the vehicle instruction determination module 324 determines driving instructions for one or more connected vehicles in the QM control region in the adjacent lane. The driving instructions may comprise a speed that the connected vehicle should drive in order to create a gap in front of the connected vehicle such that a vehicle in the vehicle queue can transfer lanes in front of the connected vehicle.

At step 410, the vehicle instruction transmission module 326 transmits the driving instructions to the connected vehicle for which the instructions were determined. The connected vehicle may then receive and implement the driving instructions.

Figure 5:
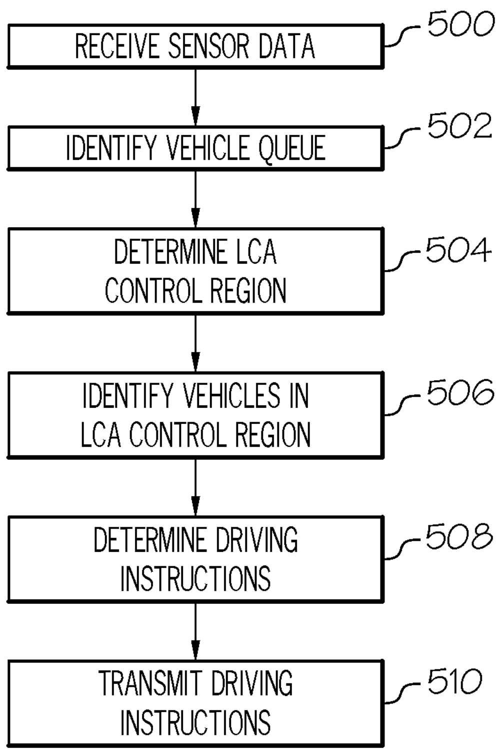
FIG. 5 depicts an example method of operating the traffic management system of FIGS. 1 and 3 to perform lane change assistance, according to one or more embodiments shown and described herein.

FIG. 5 depicts a flowchart for operating the traffic management system 102 to perform lane change assistance. At step 500, the sensor data reception module 314 receives sensor data from one or more connected vehicles. The received sensor data may indicate positions, speeds, and other information about connected and non-connected vehicles traveling along a road.

At step 502, the vehicle queue identification module 316 identifies a vehicle queue in a lane of traffic based on the data received by the sensor data reception module 314. In particular, the vehicle queue identification module 316 may determine a length of a vehicle queue, the front and tail locations of the vehicle queue, and the moving speed of the vehicle queue.

At step 504, the LCA control region determination module 322 determines an LCA control region based on data associated with the vehicle queue identified by the vehicle queue identification module 316. In some examples, the LCA control region determination module 322 may determine an LCA control region extending a predetermined fixed distance behind the tail location of the vehicle queue. In other examples, the LCA control region determination module 322 may determine an LCA control region in any other manner.

At step 506, the vehicle instruction determination module 324 identifies one or more connected vehicles in the LCA control region. Then, at step 508, the vehicle instruction determination module 324 determines driving instructions for one or more connected vehicles in the LCA control region. The driving instructions may instruct a connected vehicle in the LCA control region to change lanes into an adjacent lane in order to avoid the identified vehicle queue.

At step 510, the vehicle instruction transmission module 326 transmits the driving instructions to the connected vehicle for which the instructions were determined. The connected vehicle may then receive and implement the driving instructions.

Figure 6:
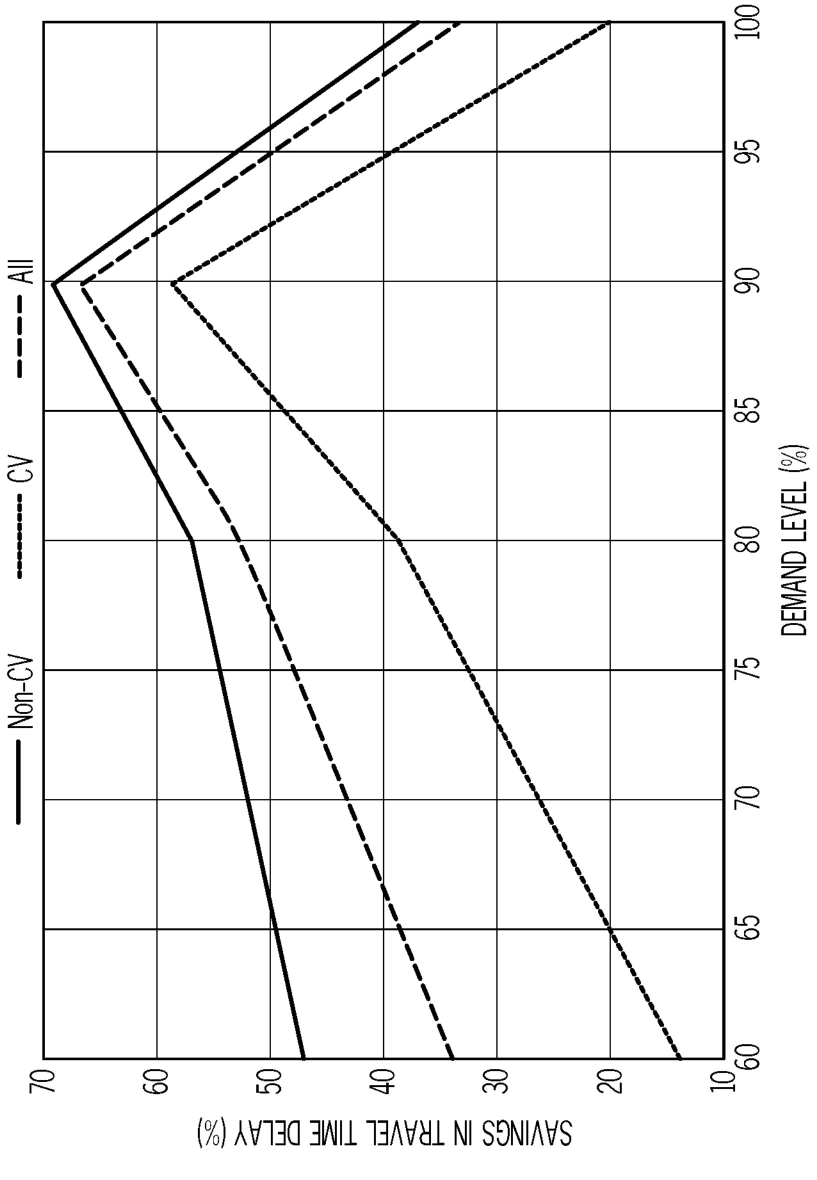
FIG. 6 illustrates simulation results of traffic levels when using the traffic management server of FIGS. 1 and 3, according to one or more embodiments shown and described herein.

The disclosed traffic management system 102 was simulated to determine travel time savings at different demand levels. FIG. 6 shows a plot of the simulation results showing savings in travel time delay versus demand level (e.g., different levels of traffic congestion) for connected vehicles, non-connected vehicles, and all vehicles. As can be seen in FIG. 6, as demand level increases, travel time savings increase for all vehicles until peaking at a congestion level of 90%. After that, travel time savings begin to decrease for congestion levels above 90%. This is likely due to the limited amount of space for vehicles to change lanes at high congestion levels.

In addition, FIG. 6 shows that travel time savings are greater for non-connected vehicles than for connected vehicles. This is likely due to the fact that the connected vehicles receive the instructions from the traffic management system 102 and slowing down to allow other vehicles to make lane changes, whereas non-connected vehicles do not receive such instructions.

FIG. 7 shows a chart of simulation results when only queue management is performed and when queue management is performed along with lane change assistance. As shown in FIG. 7, travel time savings are higher when queue management and lane change assistance are both implemented.

Figure 8:
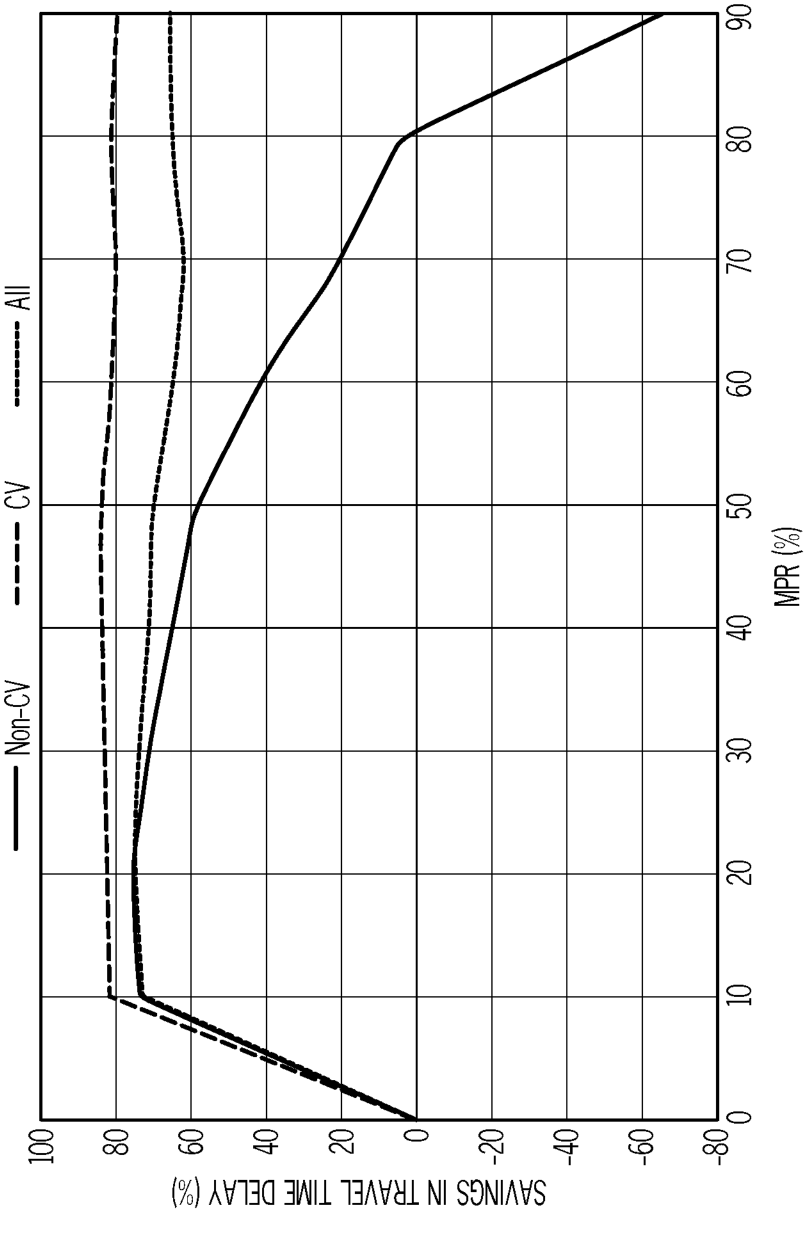
FIG. 8 illustrates additional simulation results of traffic levels when using the traffic management server of FIGS. 1 and 3, according to one or more embodiments shown and described herein.

FIG. 8 shows a chart of simulation results showing travel time savings at different market penetration rates (MPRs) of connected vehicles. As shown in FIG. 8, once MPR reaches 10%, the travel time savings is fairly consistent for connected vehicles as MPR increases. However, once MPR reaches 50%, the travel time savings decreases for non-connected vehicles. This is likely because, with more connected vehicles on the road, there is less savings available to non-connected vehicles.

It should now be understood that embodiments described herein are directed to integrated congestion mitigation for freeway non-recurring queue avoidance. A traffic management system may receive sensor data from connected vehicles and may identify a vehicle queue in a lane of traffic. The traffic management system may then determine a queue management control region where queue management may be implemented.

The traffic management system may monitor traffic in a lane adjacent to the vehicle queue within the queue management control region and may identify connected vehicles therein. The traffic management system may transmit driving instructions to one or more connected vehicles to cause the connected vehicles to reduce their speed in order to create a gap in front of a connected vehicle into which a vehicle in the vehicle queue may change lanes.

The traffic management system may also determine a lane change assistance control region behind the vehicle queue. The traffic management system may identify connected vehicles in the lane change assistance control region and may transmit driving instructions to cause the connected vehicles to change lanes before reaching the vehicle queue. The queue management and lane change assistance performed by the traffic management system may increase overall traffic flow.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of operating a traffic management system comprising:

identifying a vehicle queue in a first lane of a road based on sensor data from one or more connected vehicles traveling along the road;

identifying a first connected vehicle behind the vehicle queue in the first lane, and within a first predetermined threshold distance behind a tail end of the vehicle queue;

determining driving instructions for the first connected vehicle to change lanes from the first lane to a second lane adjacent to the first lane before the first connected vehicle reaches the vehicle queue; and transmitting the driving instructions to the first connected vehicle, thereby causing the first connected vehicle to implement the driving instructions.

2. The method of claim 1, Thrther comprising:

determining a spacing between the first connected vehicle and a leading vehicle positioned in front of the first connected vehicle; and determining the driving instructions to cause the first connected vehicle to reduce speed if the spacing between the first connected vehicle and the leading vehicle is less than a predetermined threshold distance.

3. The method of claim 1, further comprising determining parameters of the vehicle queue based on the sensor data, the parameters comprising:

a length of the vehicle queue;

a speed of the vehicle queue;

a front location of the vehicle queue; and a tail location of the vehicle queue.

4. The method of claim 3, further comprising determining the driving instructions for the first connected vehicle based on the parameters of the vehicle queue.

5. A server comprising a controller configured to:

identify a vehicle queue in a first lane of a road based on sensor data from one or more connected vehicles traveling along the road;

identify a first connected vehicle behind the vehicle queue in the first lane. and within a first predetermined threshold distance behind a tail end of the vehicle queue;

transmit the driving instructions to the first connected vehicle, thereby causing the first connected vehicle to implement the driving instructions.

6. The server of claim 5, wherein the controller is further configured to:

determine a spacing between the first connected vehicle and a leading vehicle positioned in front of the first connected vehicle; and determine the driving instructions to cause the first connected vehicle to reduce speed if the spacing between the first connected vehicle and the leading vehicle is less than a predetermined threshold distance.

7. The server of claim 5, wherein the server is further configured to determine parameters of the vehicle queue based on the sensor data, the parameters comprising:

a length of the vehicle queue;

a speed of the vehicle queue;

a front location of the vehicle queue; and a tail location of the vehicle queue.

* * * * *